United States Patent [19]
Kikuchi et al.

[11] Patent Number: 6,062,830
[45] Date of Patent: May 16, 2000

[54] DIAPHRAGM TYPE DAMPER

[75] Inventors: Hideya Kikuchi; Etsurou Hozumi; Nobuo Aoki; Akinao Minegishi, all of Matsuyama, Japan

[73] Assignee: Zexel Corporation, Tokyo, Japan

[21] Appl. No.: 08/920,901

[22] Filed: Aug. 29, 1997

[30] Foreign Application Priority Data

Sep. 3, 1996 [JP] Japan .................................. 8-318462

[51] Int. Cl.$^7$ ................................................ F04B 11/00
[52] U.S. Cl. ............................................ 417/540; 417/543
[58] Field of Search ................................. 417/540, 543, 417/470; 138/26

[56] References Cited

U.S. PATENT DOCUMENTS

| | | | |
|---|---|---|---|
| 4,427,029 | 1/1984 | Charney et al. | 138/30 |
| 4,548,713 | 10/1985 | Schmid | 210/198.2 |
| 4,587,993 | 5/1986 | Hartl | 138/30 |
| 4,629,562 | 12/1986 | Kercher | 210/198.2 |
| 5,129,427 | 7/1992 | White et al. | 138/30 |
| 5,171,134 | 12/1992 | Morgart et al. | 417/540 |
| 5,353,840 | 10/1994 | Paley et al. | 138/31 |
| 5,794,594 | 8/1998 | Fehlmann | 123/450 |

*Primary Examiner*—Charles G. Freay
*Assistant Examiner*—Cheryl J. Tyler
*Attorney, Agent, or Firm*—Wenderoth, Lind & Ponack, L.L.P.

[57] ABSTRACT

A diaphragm type damper has a combined member, which is formed by welding a marginal portion of a diaphragm to a half body having a concave portion formed therein, and is fixed to a pressure chamber portion to which high pressure fluid is introduced. A wall thickness of a welding portion of the half body is not relevant to welding, and the heat capacity of the welding portion is small. Since the half body is allowed to have a large wall thickness, leakage from the welding portion and damage to that portion can be prevented. In addition, the diaphragm type damper of this present invention can be easily assembled, since it requires only fixing the combined member to the pressure chamber portion.

19 Claims, 8 Drawing Sheets

FIG. 11 PRIOR ART high pressure discharge port ←

FIG. 12 PRIOR ART

DIAPHRAGM TYPE DAMPER

BACKGROUND OF THE INVENTION

The present invention relates to a diaphragm type damper for reducing pulsations of fluid pressure, and particularly to a diaphragm type damper for reducing pulsations of high pressure fluid.

There is generally known a pulsation absorbing device for absorbing pulsations of fluid in a fluid passage. For example, a bladder type accumulator falls under this sort of pulsation absorbing device. The bladder type accumulator, which uses a rubber diaphragm, has a problem in that high pressure gas sealed in a back pressure chamber penetrates through the diaphragm to leak. In addition, the bladder type accumulator has a drawback in that it has a large size and a heavy weight.

On the other hand, Japanese Utility Preliminary Publication No. Hei 5-1854 discloses fuel supply equipment provided with a diaphragm type accumulator (diaphragm type damper) for reducing pulsations.

Figure 11:
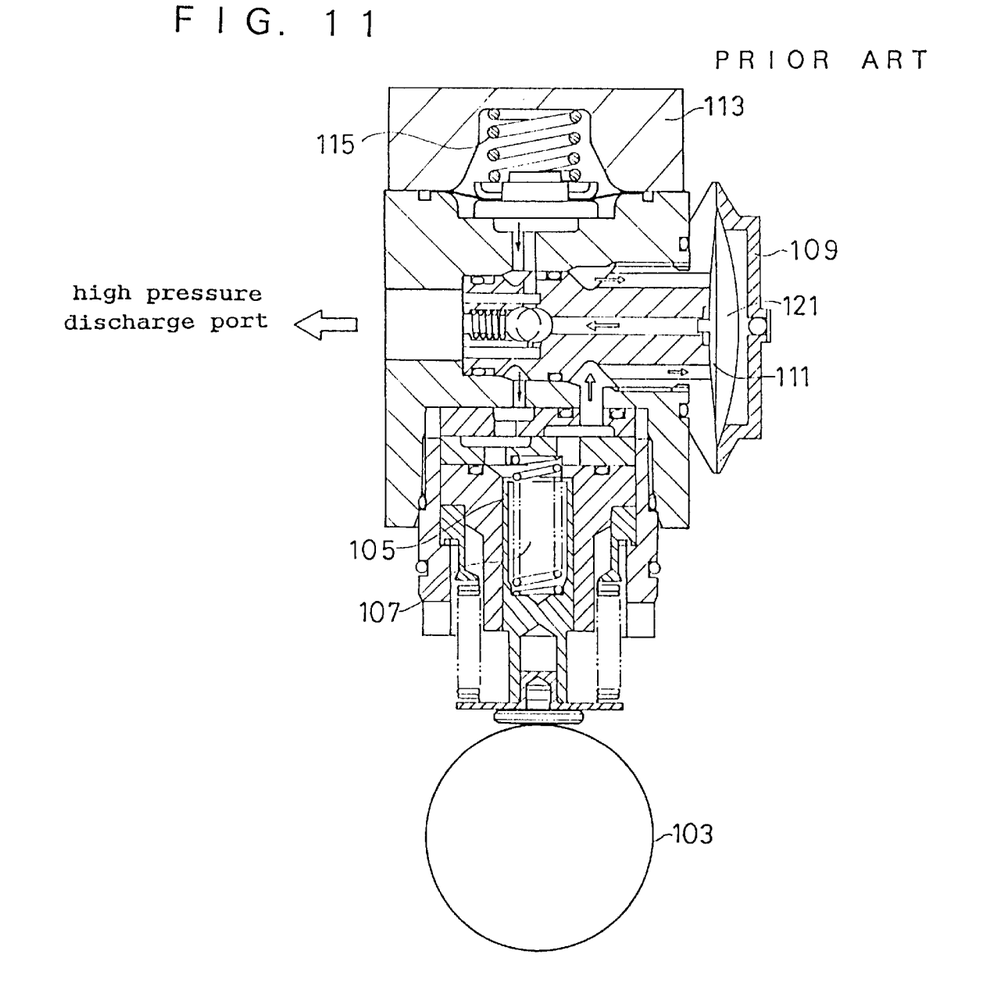
FIG. 11 is a sectional view of a conventional fuel supply pump.

A high pressure gasoline pump, to which a conventional damper is fitted, has a structure as shown in FIG. 11. A plunger 105 is driven by a cam 103 to reciprocate. A discharge passage for discharging fuel, which is pressurized in a pressurizing chamber 107, is connected with a pressure chamber 111 of a high pressure damper 109. The pressurized fuel (high pressure fuel) has its high pressure pulsations damped in the high pressure damper 109, and then it is discharged. Incidentally, in FIG. 11, a low pressure damper 113 is provided on the side of an intake passage for introducing fuel from an intake port. The low pressure damper 113 is used for reducing pressure pulsations for low pressure fuel, and reduces low pressure pulsations by using a helical spring 115.

Figure 12:
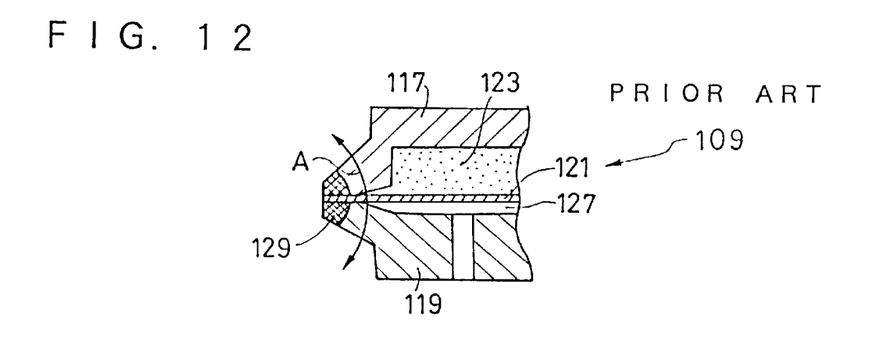
FIG. 12 is a sectional view showing a part of a conventional high pressure damper shown in FIG. 11.

As shown in FIG. 12, the high pressure damper 109 is formed by having a metal diaphragm 121 interposed between an upper half body 117 and a lower half body (pressure chamber member) 119, and seals high pressure gas in a back pressure chamber 123 defined by the upper half body 117 and the diaphragm 121. Between the lower half body 119 and the diaphragm 121 is formed a pressure chamber 127. The diaphragm 121 faces the pressure chamber 127 and reduces pulsations in the pressure chamber 127. The high pressure damper 109 is conventionally formed by interposing the diaphragm 121 between the upper half body 117 and the lower half body 119 and welding those three members together at a welding portion 129.

In the above described welding structure of the welding portion 129, heat capacity at the time of welding needs to be made as small as possible so that the three members can be welded together from the outside. Therefore, marginal portions of the upper half body 117 and the lower half body 119 (in the welding portion 129) are made as thin as possible. However, because of this thin formation of the welding portion 129, when the pump is operated, a force coming from the high pressure gas sealed in the back pressure chamber 123 and the high pressure fluid acts on the welding portion 129 in such a manner so as to urge the welding portion 129 to open as indicated by an arrow A in FIG. 12 (bending moment). This bending moment A causes mechanical fatigue at the welding portion 129 where the half bodies 117 and 119 are thinner which leads to damage and/or leakage.

SUMMARY OF THE INVENTION

The object of the present invention is to provide a diaphragm type damper which can prevent leakage and damage.

According to a first aspect of the present invention, there is provided a diaphragm type damper, comprising:

a combined member formed of a half body having a concave portion formed inside a marginal portion thereof and a diaphragm covering the concave portion of the half body, the half body and the diaphragm being combined in a manner such that a marginal portion of the diaphragm is fixed to the marginal portion of the half body by welding performed from the diaphragm side, the combined member having a back pressure chamber in a space defined by the concave portion and the diaphragm;

a pressure chamber portion for defining a pressure chamber which faces the diaphragm, the pressure chamber portion being formed with a concave portion and an introducing passage for introducing pressure fuel into the concave portion of the pressure chamber portion; and fixing means for fixing the marginal portion of the diaphragm to a surrounding portion of the pressure chamber portion.

According to this first aspect of the present invention, first, the combined member is formed by fixing the diaphragm to the half body at its marginal portion surrounding its concave portion by welding. In that welding process, only two members (i.e., the diaphragm and the half body) need to be welded. Further, welding is performed in the manner that the diaphragm is placed on the marginal portion of the half body and welded thereto from the diaphragm's surface side. Therefore, welding can be performed easily, and the wall thickness of a welding portion of the half body is not relevant to welding. Further, the heat capacity of the welding portions is small, since the heat for welding is required only for the contact surface portions of the diaphragm and the half body. In other words, the quantity of heat required for welding is small. Furthermore, the half body as a whole does not influence the quantity of heat required for welding, since only a surface of the marginal portion of the half body is concerned during welding. Thus, the half body can have a large wall thickness at its welding portion. In other words, the half body can be thick at its portion supporting the welding portion, so that it has a large strength at the welding portion. Accordingly, the half body can sufficiently bear the internal pressure acting on the welding portion, so that leaks from the welding portion and damage to the welding portion can be prevented.

Next, the combined member is fixed to the pressure chamber portion by the fixing means. The fixing means can be welding, caulking, fixing by bolts and so forth. Therefore, fixing or assembly can be performed easily and a large number of options with respect to the fixing means are provided.

When the diaphragm type damper is fitted to a pump for pressure feeding of fuel (hereunder referred to as a "fuel pressure-feed pump"), it is desirable to form the pressure chamber portion in a pump body of the fuel pressure-feed pump and fix the combined member directly to the pump body of the fuel pressure-feed pump. When the pressure chamber portion is provided with the pump body of the fuel pressure-feed pump in this manner, the number of parts can be reduced.

As the aforementioned fixing means, bolt fastening is desirable. Specifically, it is desirable to fix the combined member to the pump body of the fuel pressure-feed pump by fastening bolts from the combined members half body side. By bolt fastening, the diaphragm type damper can be fitted easily to the pump body of the fuel pressure-feed pump.

As the aforementioned fixing means, it is also desirable to fix the combined member on the pressure chamber portion by caulking a caulking piece. Fixing by caulking can be performed easily and with a simple structure. The caulking piece is provided at the pump body of the fuel pressure-feed pump or at the combined member. By caulking with the provided caulking piece, the combined member is fixed on the pressure chamber portion of the pump body.

It is also possible to form, in the aforementioned pump body, a receiving hollow. The aforementioned combined member is embedded in the receiving hollow, and the pressure chamber is provided at the bottom of the receiving hollow. By embedding the combined member in the pump body, projection of the diaphragm type damper from the pump can be avoided.

It is also possible to provide the pressure chamber portion as a pressure chamber member separate from the pump body of the fuel pressure-feed pump. The combined member and the pressure chamber member together can be fixed by the fixing means with the combined member overlaid on the pressure chamber member. Since the pressure chamber portion is a separate member, machining can be performed easily. Particularly since the pump body does not require machining with high precision, assembly becomes easier.

According to a second aspect of the present invention, there is provided a method for making a diaphragm type damper, comprising:

a process of making a combined member by combining a half body having a concave portion formed inside a marginal portion thereof and a diaphragm covering the concave portion of the half body, the half body and the diaphragm being combined in the manner that a marginal portion of the diaphragm is fixed to the marginal portion of the half body by welding performed from the diaphragm side, thereby defining therebetween a space for a back pressure chamber; and a process of fixing the combined member to a pressure chamber portion formed with a concave portion for a pressure chamber and a passage for introducing pressure fuel into the concave portion of the pressure chamber portion, thereby defining the pressure chamber between the diaphragm and the concave portion of the pressure chamber portion.

This second aspect of the present invention relates to a method for making the diaphragm type damper according to the second aspect of the present invention, and provides effects similar to those provided by the first aspect. The welding of the assembly can be easily performed. The heat capacity of a welding portion is small, since the wall thickness of the welding portion of the half body is not relevant to welding. The welding portion is strong, since the half body is allowed to have a large wall thickness at its welding portion (i.e., thick at its portion supporting the welding portion). Thus, the half body can sufficiently bear the internal pressure acting on the welding portion, so that leaks from the welding portion and damage to the welding portion can be prevented.

It is desirable that the aforementioned pressure chamber portion is formed part of a pump body of a fuel pressure-feed pump. Further, it is desirable that the aforementioned method further comprises a process of forming a pressure chamber having a concave shape in the pump body of the fuel pressure-feed pump. Since the pressure chamber portion is provided with the pump body of the fuel pressure-feed pump, the number of parts can be reduced.

It is desirable that the aforementioned method further comprises a process of forming in the aforementioned pump body a receiving hollow for having the combined member embedded therein. By doing so, projection of the diaphragm type damper from the pump can be avoided.

DESCRIPTION OF THE PREFERRED EMBODIMENTS

A first embodiment of the present invention will be described in detail below with reference to FIGS. 1 to 4 of the attached drawings. A fuel supply pump 3, which a diaphragm type damper 1 according to the present embodiment is fitted, is a pump which injects gasoline directly into a combustion chamber of a gasoline engine. It is used in a fuel supply system, which is called a direct injection type gasoline engine, and performs pressure feeding of high pressure gasoline.

Figure 1:
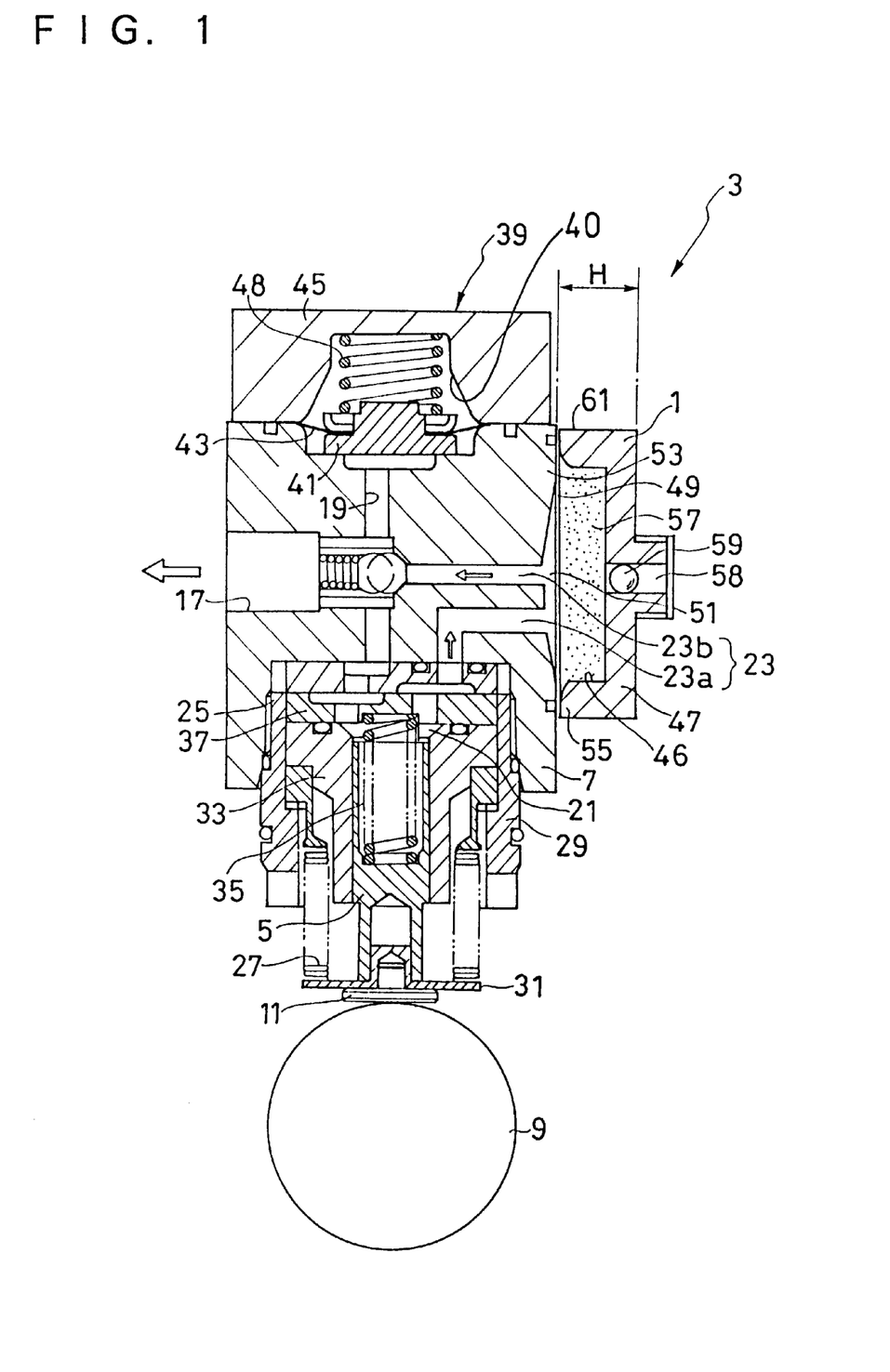
FIG. 1 is a front sectional view of a fuel supply pump according the present invention.

The high pressure gasoline pump 3 includes a pump housing 7, which contains a plunger 5, and a lower body (not shown), which contains a cam 9 for driving the plunger 5. The cam 9 is driven by an engine (not shown) to rotate, and thereby drives the plunger 5 through a contact member 11 to slide vertically up and down. More specifically, the contact member 11 is fitted in a lower end of the plunger 5. When the cam 5 rotates, the peripheral portion of the cam 9 comes in contact with the contact member 11, and thereby drives the plunger 5 to slide vertically up and down.

Figure 2:
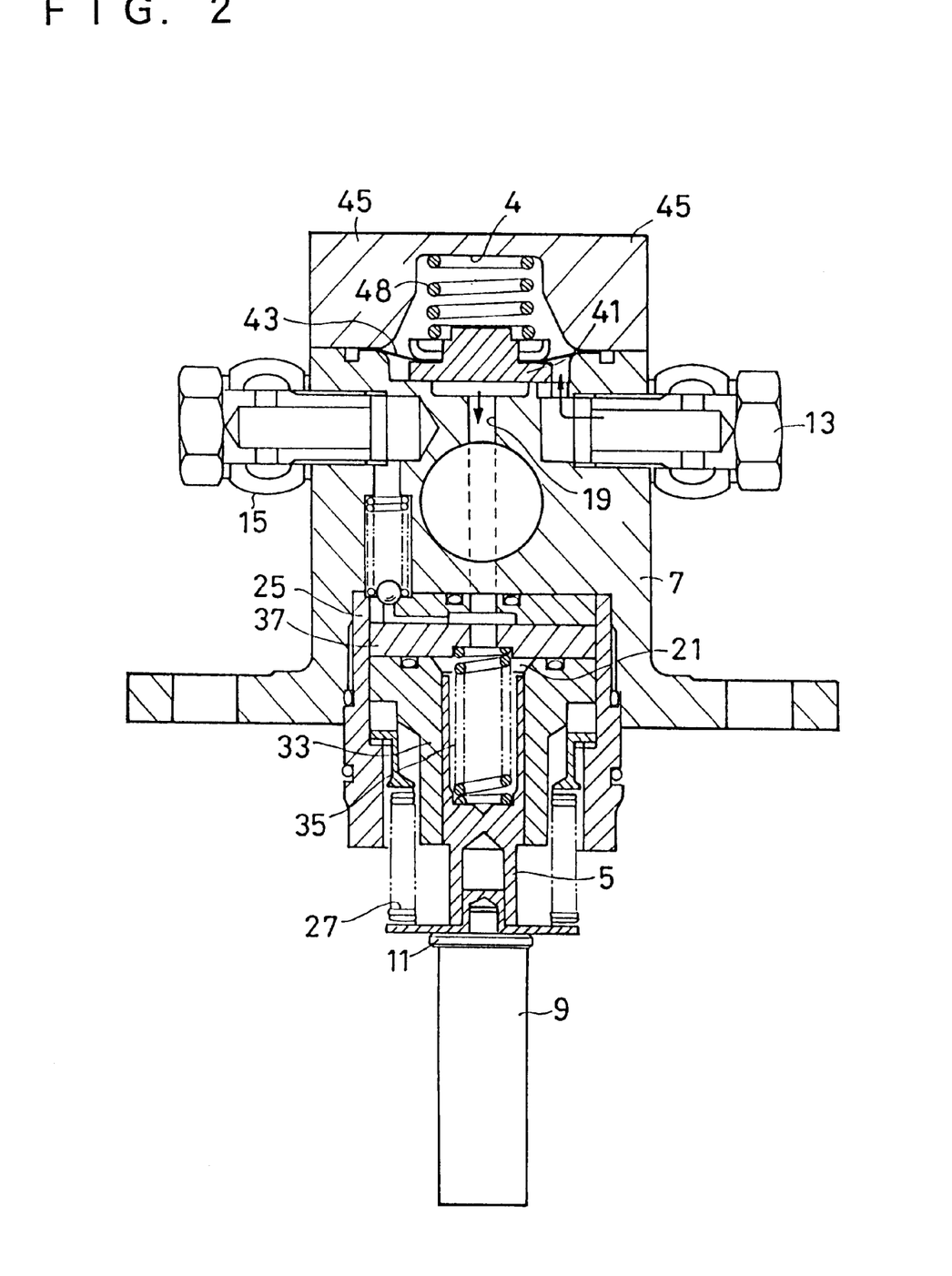
FIG. 2 is a side sectional view of the fuel supply pump according to the present invention.

As shown in FIG. 2, the pump housing 7 is further provided with an intake portion 13 through which low pressure fuel is supplied. A tank port 15 is provided through which surplus fuel is returned to a tank (not shown). A discharge port 17 is provided (shown in FIG. 1) through which fuel pressurized by the plunger 5 is discharged.

The intake port 13 is connected with a pump chamber 21 through a fuel supply passage 19 formed in the pump housing 7 as shown in FIG. 2. The discharge port 17 is connected with the pump chamber 21 through a fuel discharge passage 23 as shown in FIG. 1. The fuel discharge passage 23 includes a first passage 23a, which connects the pump chamber 21 to a pressure receiving chamber 51 of the diaphragm type damper 1. Also, the fuel discharge passage 23 includes a second passage 23b, which connects the pressure receiving chamber 51 to the discharge port 17.

In a large diameter hole formed in the pump housing 7, a fixed member 29 is fitted with its thread 25 engaged therewith. A barrel 33 for guiding the sliding of motion of the plunger 5 is fixed inside the fixed member 29. Under the fixed member 29 is provided a bellows 27 with its axis substantively corresponding to the axis of the plunger 5. The upper end of bellows 27 is fixed to the fixed member 29 fitted in the pump housing 7. The lower end of bellows 27 is fixed to a support member 31 fitted in the lower end of the plunger 5. The bellows 27 expands and contracts as the plunger 5 slides vertically up and down, and seals off the fuel surrounding the plunger 5 from the outside. The bellows 27 is a metal bellows.

The bellows 27 extends inside the barrel 33. The plunger 5 slides vertically up and down along the barrel 33. As shown in FIG. 1, the plunger 5 has opened hollows formed at its upper and lower end portions. The lower end of the plunger 5 is supported on the support member 31. At the upper end side, a lower end of a spring 35 is in contact with the plunger 5. The spring 35 urges the plunger 5 constantly downwards. The upper end of the spring 35 is supported at the lower surface of a fixed member 37. Thus, the pump chamber 21 for pressurizing fuel is formed between the lower surface of the fixed member 37 and the plunger 5.

The fuel supply passage 19 is so formed as to pass through a lower pressure damper 39 provided at the upper side of the pump housing 7. The lower pressure damper 39 reduces lower pressure pulsations in the fuel supply passage 19. The lower pressure damper 39 has a pressure receiving portion 41 supported by a diaphragm 43. The pressure receiving portion 41 is so urged by a helical spring 48 contained in a case 45 so as to close the fuel supply passage 19. When a pressure larger than a predetermined value is received, the pressure receiving portion 41 opens the fuel supply passage 19, thereby reducing the lower pressure pulsations. A back pressure chamber 40, which contains the helical spring 48, is sealed at atmospheric pressure. Alternatively, the back pressure chamber 40 may be connected with a fuel tank and an intake manifold in order to recover fuel.

The fuel discharge passage 23 is connected, by its first and second passages 23a and 23b, with the pressure receiving chamber 51. The high pressure damper 1 (diaphragm type damper) is fitted to the pump housing 7, so that pulsations of high pressure produced at the time of fuel discharge is reduced. The high pressure damper 1 comprises basically a half body 47 having a concave portion 46 formed therein, a diaphragm 49 fixed to the half body 47 by welding, and a pressure chamber member 53 for forming the pressure receiving chamber 51 for receiving pressure from the pressurized fuel.

The diaphragm 49 is fitted to the half body 47 to cover an opening of the concave portion 46 formed therein. The concave portion 46 defines a back pressure chamber 57 in which high pressure gas is sealed. The diaphragm 49 is made of metal and is fixed to the half body 47. A marginal portion of diaphragm 49 is welded to marginal portion 55 of the half body 47. A portion (wall) of the half body 47, which supports the marginal portion 55, extends in a substantially orthogonal direction with respect to the diaphragm 49. The half body 47 has, at its welding portion, a wall thickness indicated by a height H in FIG. 1. Thus, the half body 47 has a sufficient wall thickness.

In the manufacturing process of the present embodiment, only two members (i.e., the half body 47 and the diaphragm 49) are welded together at the marginal portion of the diaphragm 49, and thereby forming a combined member 61. The diaphragm 49 is placed on the marginal portion 55 of the half body 47 and welded thereto from the diaphragm's surface side. Thus, welding can be performed easily, and the wall thickness of the welding portion of the half body 47 is not relevant to welding. Further, the heat capacity of the welding portion is small, since only the contact surface portions of the diaphragm 49 and the half body 47 are required to be heated for welding. In other words, the heat quantity required for welding is small. Furthermore, the half body 47 as a whole does not influence the quantity of heat required for welding, since only a surface of the marginal portion 55 of the half body 47 affects welding. Therefore, the half body 47 is allowed to have a large wall thickness at its welding portion. Thus, the half body 47 can sufficiently bear the internal pressure of the back pressure chamber 57 acting on its welding portion, so that leakage from that welding portion and damage to that portion can be prevented. Further, unlike the conventional case, which requires machining for making a small wall thickness, the half body 47, which does not need to have a small wall thickness at its welding portion, does not require such machining. Therefore, the half body 47 can be manufactured easily.

As shown in FIG. 1, an introducing passage 58 is used for introducing high pressure gas (for example, nitrogen gas) into the back pressure chamber 57. A seal is formed at a rear end portion of the half body 47. A sealing stopper 59 is fitted in the introducing passage 58.

Figure 3:
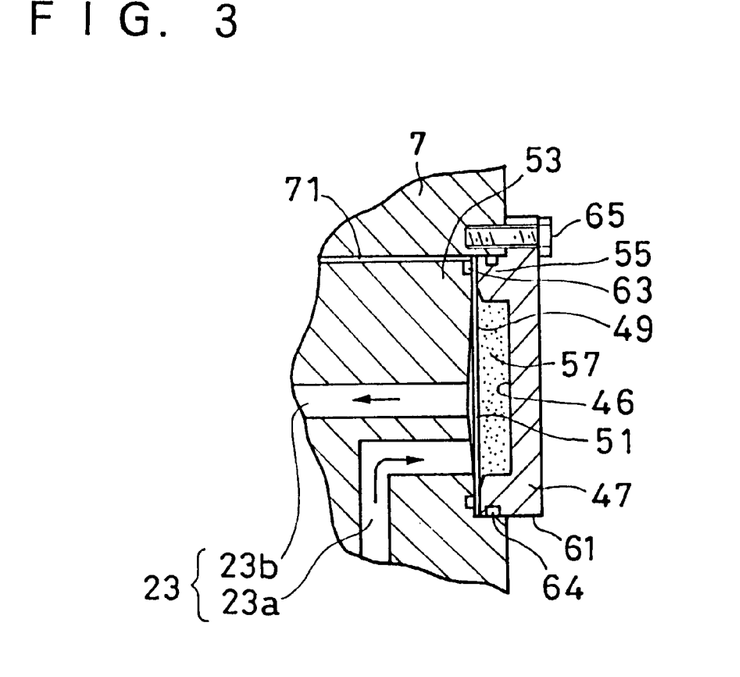
FIG. 3 is a sectional view showing a high pressure damper portion shown in FIG. 1.
Figure 4:
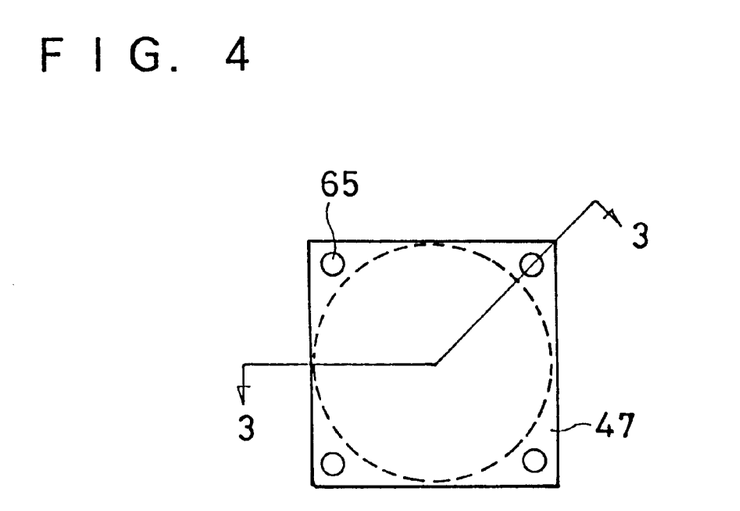
FIG. 4 is a plan view of a high pressure damper shown in FIG. 3.

As shown in FIGS. 3 and 4, a combined member 61 is formed by combining the half body 47 and the diaphragm 49 into one body. The combined member 61 is fixed directly to the pump housing 7 by bolts 65 with a sealing member 63 interposed therebetween.

Specifically, the pump housing 7 is formed with a concave portion which defines, along with the diaphragm 49, a pressure receiving chamber 51. The pressure receiving chamber 51 is connected with the discharge passage 23 and receives the pressure therefrom. In the present embodiment, the pressure receiving chamber 51 is provided without using a separate pressure-chamber-member having a pressure receiving chamber formed therein. The pump housing 7 itself provides for the pressure receiving chamber 51. According to this structure, the number of parts can be reduced, and the pump can be smaller.

As shown in FIG. 3, the pressure receiving chamber 51 is connected with the first high pressure discharge passage 23a, which is connected with the pressurizing chamber 21 (shown in FIG. 1), and the second high pressure discharge passage 23b, which is connected with the discharge port 17 (shown in FIG. 1). Further, a connecting passage 71, which is connected with the low pressure fuel supply passage 19, is formed so as to support a sealing member 64 by the low pressure fuel. This prevents the fuel from leaking from that portion. The reference numeral 63 indicates another sealing member.

Next, the function of the present embodiment will be described.

When the cam 9 is rotated, the plunger 5 is driven though the contact member 11 to slide vertically up and down. When the plunger 5 slides upward, the fuel in the pressurizing chamber 21 is pressurized, and the pressurized fuel is discharged into the discharge passage 23a. When the plunger 5 slides downward, the low pressure fuel is taken in from the intake port 13. The low pressure fuel flows through the fuel supply passage 19. The low pressure fuel has its low pressure pulsations reduced by the low pressure damper 39. Then it is supplied to the pressurizing chamber 21. In the low pressure damper 39, when the pressure receiving portion 41 receives the pressure of the low pressure fuel, the fuel supply passage 19 is opened overcoming the biasing force of the helical spring 48 to thereby reduce the low pressure pulsations. Thus, the fuel, having its pulsations reduced by the low pressure damper 39, is supplied to the pressurizing chamber 21. By reducing these pulsations of the low pressure fuel, the pulsations of the discharged fuel can be reduced.

The fuel pressurized in the pressurizing chamber 21 flows through the first discharge passage 23a, the high pressure damper 1 (diaphragm type damper) and the second discharge passage 23b. Then the fuel is supplied to the discharge port 17. In the high pressure damper 1, pulsations received by the pressure receiving chamber 51 is reduced through deformation (or displacement) of the diaphragm 49, which is supported by the high pressure gas sealed in the back pressure chamber 57.

In the high pressure damper 1, the half body 47 has a sufficient wall thickness at its marginal portion 55 where the diaphragm 49 is welded to the half body 47. Therefore, when the high pressure in the back pressure chamber 57 and the pressure in the pressure receiving chamber 51 act on the marginal portion 55, the marginal portion 55 can sufficiently bear those pressures. Fatigue and damage to that portion 55 due to the high pressure gas in the back pressure chamber 57 is prevented.

Next, the assembly of the high pressure damper 1 will be explained.

First, the combined member 61 is formed by welding the marginal portion of the metal diaphragm 49 to the marginal portion 55 of the half body 47 in order to combine them into one body. The diaphragm 49 is placed on the half body 47 to cover the opening of the concave portion 46. Then the marginal portion of the diaphragm 49 is welded to the half body 47 from the diaphragm 49 side. This welding is not limited to a specific type. For example, using laser welding the aforementioned welding can be performed easily. Since only two members (i.e., the half body 47 and the diaphragm 49) need to be welded, and since the welding can be performed from the diaphragm 49 side, which restricts welding portions to a small range, heat capacity at the time of welding can be greatly lowered.

The pump housing 7 is formed with a concave portion, which forms the pressure receiving chamber 51. The combined member 61 is fixed to the pump housing 7 by bolts 65 with a sealing member 63 interposed therebetween. The pressure receiving chamber 51 is formed by the shape of the pump housing 7 itself. Thus, the number of parts of the high pressure damper is reduced and the weight of that damper can be reduced. Further, the combined member 61 can be easily fixed to the pump housing 7 by bolts 65.

Other embodiments of the present invention will be described below. The portions corresponding to those of the previous embodiment will be indicated by the same reference numerals. A detailed explanation of those portions will be omitted.

Figure 5:
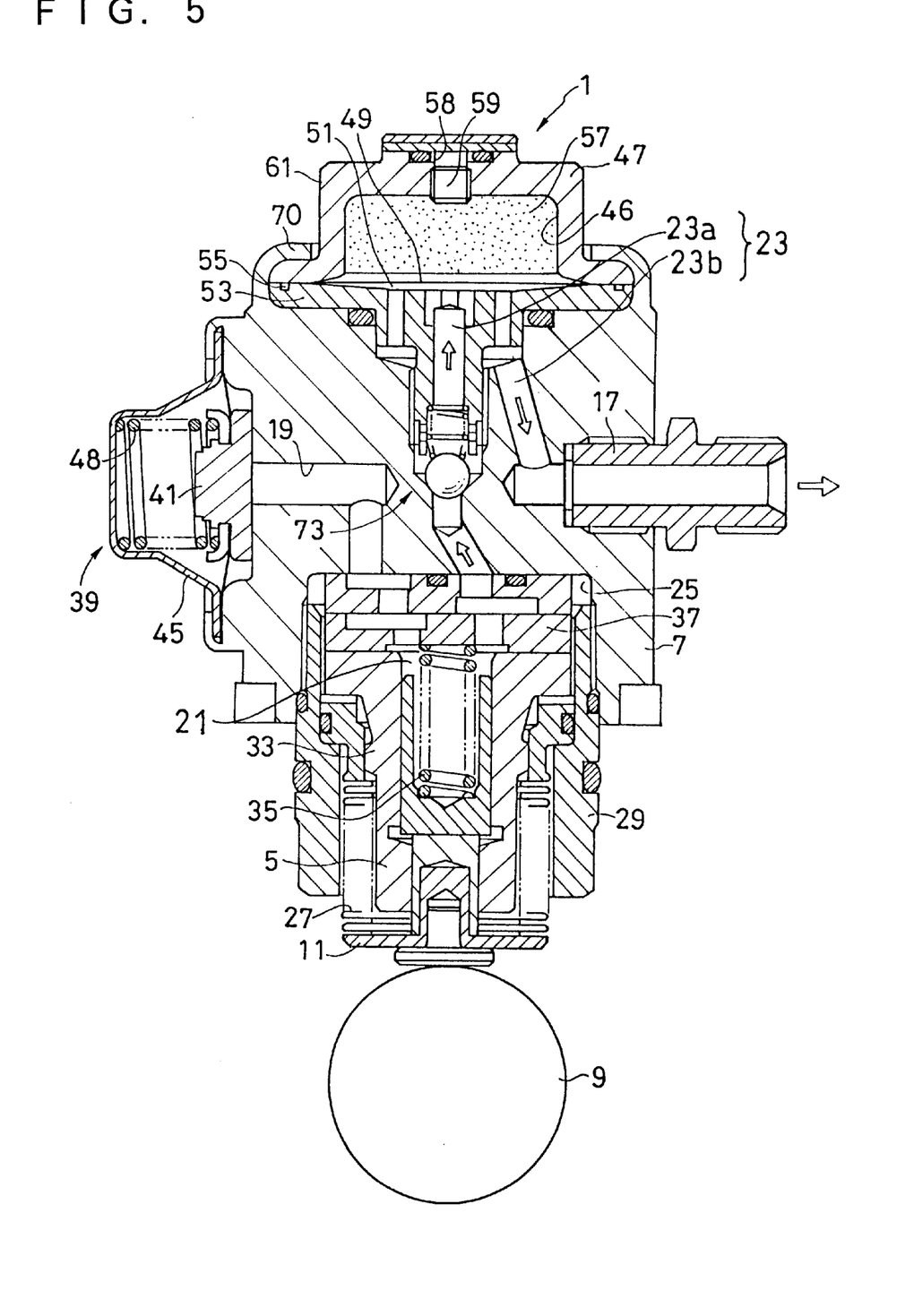
FIG. 5 is a sectional view of a fuel supply pump according to a second embodiment of the present invention.

In a second embodiment shown in FIG. 5, the high pressure damper 1 is fixed to the pump housing 7 by caulking, and a separate pressure-chamber-member 53 is fitted to the pump housing 7. Specifically, the combined member 61 is formed by welding the half body 47 and the diaphragm 49. The combined member 61 is overlaid on the pressure chamber member 53, and those two members are fixed on the pump housing 7 by caulking a lug 70, which is formed on the pump housing 7. In this embodiment, the fuel discharge passage 23 is formed in the pressure chamber member 53, and the pressure chamber member 53 is fitted in the pump housing 7. In FIG. 5, reference numeral 73 indicates a one-way valve which opens when high pressure fuel is discharged.

Figure 6A:
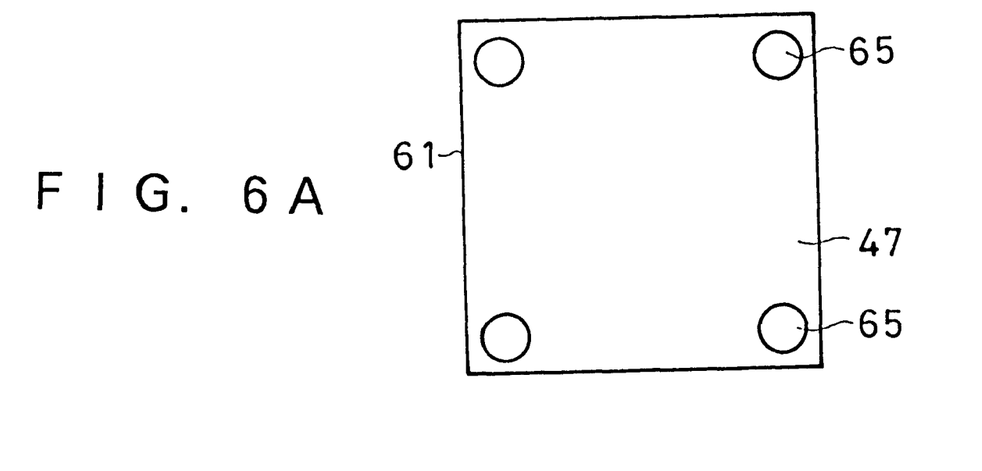
FIG. 6A is a plan view of a high pressure damper according to a third embodiment of the present invention.
Figure 6B:
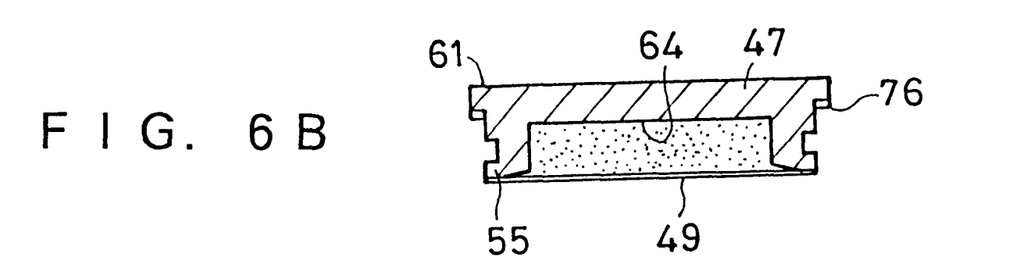
FIG. 6B is a sectional view of a combined member according to the third embodiment of the present invention.
Figure 6C:
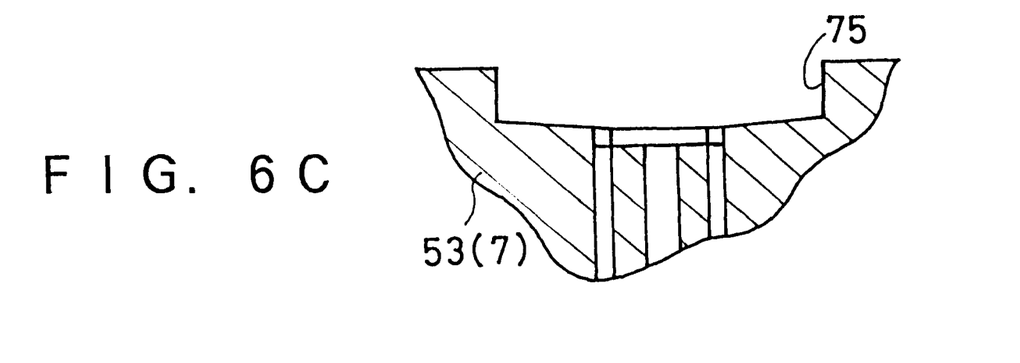
FIG. 6C is a sectional view of a pressure chamber portion formed in a pump body according to the third embodiment of the present invention.

FIGS. 6A, 6B and 6C relate to a high pressure damper 1 according to a third embodiment, and show the pressure chamber member 53 (or a pump housing 7) thereof. In the high pressure damper 1 shown in FIGS. 6A, 6B and 6C, a receiving hollow 75 is formed at the pressure chamber member 53. The combined member 61 is fitted in the receiving hollow 75 and fixed to the pump housing 7 by screws 65. Reference numeral 76 indicates a gasket for low pressure sealing. In this embodiment, the high pressure chamber 1 can be assembled easily.

Figure 7A:
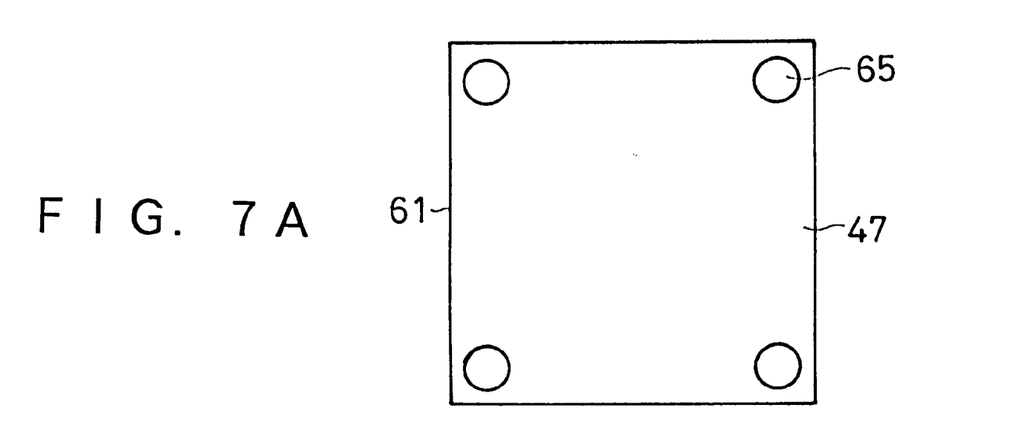
FIG. 7A is a plan view of a high pressure damper according to a fourth embodiment of the present invention.
Figure 7B:
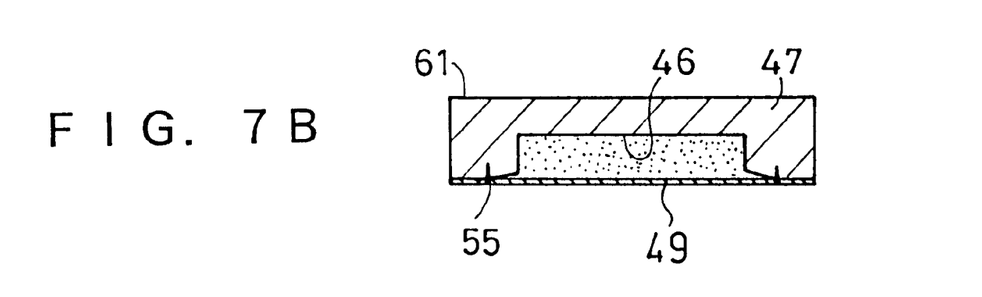
FIG. 7B a sectional view of a combined member according to the fourth embodiment of the present invention.
Figure 7C:
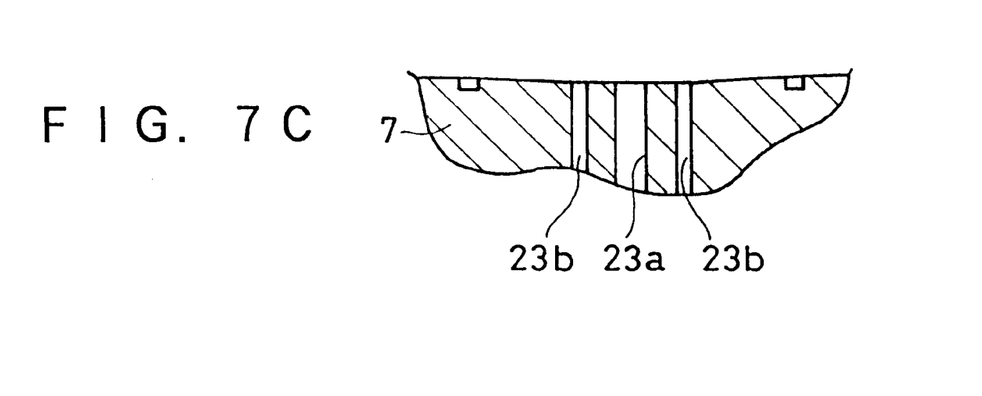
FIG. 7C a sectional view of a pressure chamber portion formed in a pump body according to the fourth embodiment of the present invention.

FIGS. 7A, 7B and 7C show the high pressure damper 1 according to a fourth embodiment. In this embodiment, a receiving hollow is not formed in the pump housing 7. The combined member 61 is fixed on the pump housing 7 and totally projects from the pump housing 7.

Figure 8:
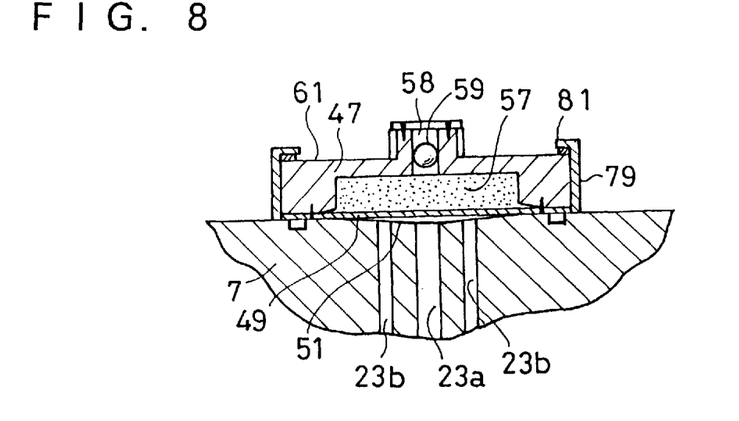
FIG. 8 is a sectional view showing a high pressure damper according to another embodiment of the present invention.
Figure 9:
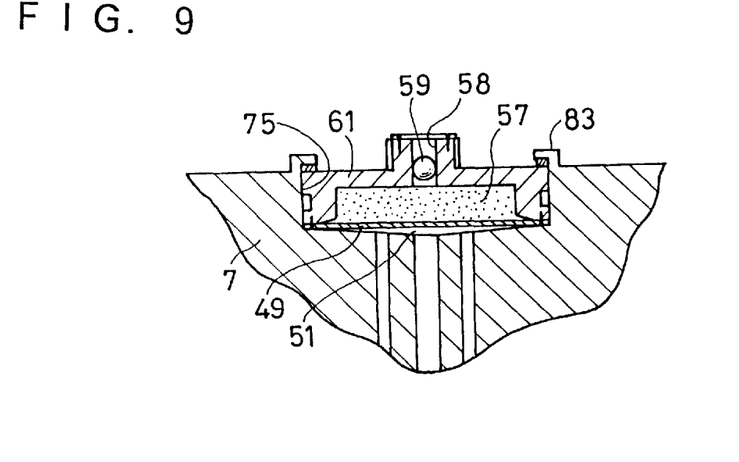
FIG. 9 is a sectional view showing a high pressure damper according to another embodiment of the present invention.
Figure 10:
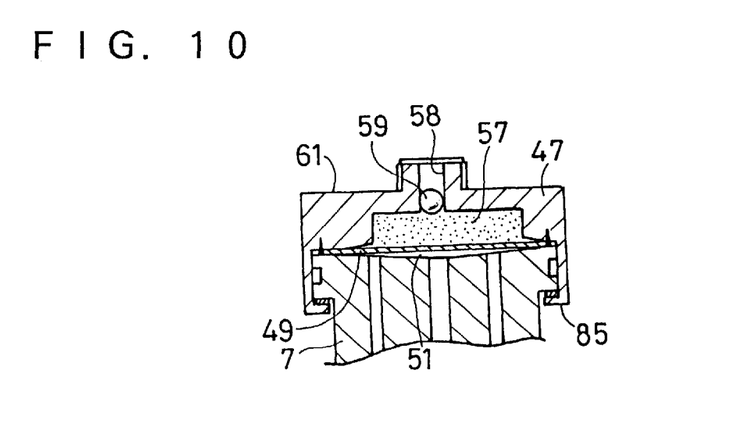
FIG. 10 is a sectional view showing a high pressure damper according to another embodiment of the present invention.

FIGS. 8 through 10 show high pressure dampers 1 according to other embodiments. A variety of examples of caulking structures for fixing the combined member 61 to the pump housing 7 (or the pressure chamber member 53) are shown.

In the structure shown in FIG. 8, a projection 79 is provided at the pump housing 7, and the combined member 61 is fixed to the pump housing 7 by caulking an upper end portion 81 of the projection 79.

In the structure shown in FIG. 9, the receiving hollow 75 is formed in the pump housing 7. The combined member 61 is fitted in the receiving hollow 75, and a lug 83 of the pump housing 7 is caulked to fix the combined member 61 to the pump housing 7.

In the structure shown in FIG. 10, the combined member 61 is caulked to be fixed. Specifically, a hollow (hole) is formed in a half body 47. A part of the pump housing 7 (a pressure chamber portion) is fitted in that hollow. A lug 85 of the half body 47 is caulked thereby fixing the combined member 61 to the pump housing 7.

In any of those embodiments shown in FIGS. 6 through 10, effects similar to those obtained in the first embodiment can be obtained.

The present invention is not limited to the aforementioned embodiments. Various modifications can be made within a range not deviating from its concept. For example, if a high pressure damper according to the present invention is applied to a fuel injection pump for diesel fuel or oil used in a diesel engine or other kinds of high pressure fluid passages instead of the aforementioned injection pump for gasoline, similar results can be obtained.

What is claimed is:

1. A diaphragm type damper, comprising:
    a combined member including
        a half body having a concave portion and a half body marginal portion, said concave portion being defined in said half body within said half body marginal portion, said half body marginal portion having a welding surface portion,
        a diaphragm covering said concave portion of said half body, said diaphragm having a diaphragm marginal portion and a diaphragm side facing away from said concave portion,
        a first connection connecting said diaphragm marginal portion to said half body marginal portion, wherein said first connection comprises a weld welded from said diaphragm side only at said welding surface portion of said half body marginal portion, and
        a back pressure chamber defined between said concave portion and said diaphragm;
    a pressure chamber portion having a concave part, a surrounding portion and a fluid passage, said concave part being defined in said pressure chamber portion within said surrounding portion, said fluid passage being defined in said pressure chamber portion for introducing pressurized fluid in said concave part;
    a second connection separate from said first connection connecting said diaphragm marginal end portion to said surrounding portion of said pressure chamber portion; and
    a pressure chamber defined between said pressure chamber portion and said diaphragm.

2. The diaphragm type damper according to claim 1, further comprising:
    a fuel pressure-feed pump having a pump body, wherein said pressure chamber portion is formed in said pump body.

3. The diaphragm type damper according to claim 2, wherein said second connection includes a bolt fastening said combined member to said pump body.

4. The diaphragm type damper according to claim 3, wherein said combined member has a half body side and said bolt is fastened from said half body side.

5. The diaphragm type damper according to claim 2, wherein said second connection includes a caulking piece caulking said combined member to said to said pressure chamber portion.

6. The diaphragm type damper according to claim 5, wherein said caulking piece is provided on said pump body.

7. The diaphragm type damper according to claim 5, wherein said caulking piece is provided on said combined member.

8. The diaphragm type damper according to claim 2, wherein said pump body includes a receiving hollow having a bottom, said pressure chamber portion being formed at said bottom of said receiving hollow, and said combined member being embedded in said receiving hollow.

9. The diaphragm type damper according to claim 1, further comprising:
    a fuel pressure-feed pump having a pump body; and
    a separate pressure chamber member attached to said pump body, wherein said pressure chamber member includes said pressure chamber portion.

10. The diaphragm type damper according to claim 1, wherein said combined member includes an introducing passage formed in said half body.

11. The diaphragm type damper according to claim 10, wherein said combined member includes a sealing stopper fitted in said introducing passage.

12. The diaphragm type damper according to claim 1, wherein said second connection includes a bolt fastening said combined member to said pressure chamber portion.

13. The diaphragm type damper according to claim 1, wherein said half body includes a wall supporting said marginal portion, said wall extending in a substantially orthogonal direction with respect to said diaphragm.

14. A method of making a diaphragm type damper, comprising:
    covering a concave portion of a half body with a diaphragm, the half body having a half body marginal portion with a welding surface portion, the diaphragm having a diaphragm marginal portion and a diaphragm side facing away from the concave portion;
    welding the diaphragm marginal portion to only the welding surface portion from the diaphragm side to form a combined member; and
    fixing the combined member to a pressure chamber portion, the pressure chamber portion having a concave part and a fluid passage, said fixing thereby defining a pressure chamber between the diaphragm and the concave part.

15. The method of claim 14, further comprising:
    forming the pressure chamber in a pump body of a fuel pressure-feed pump.

16. The method of claim 15, further comprising:
    forming a receiving hollow in the pump body.

17. The method of claim 16, further comprising:
    embedding the combined member into the receiving hollow.

18. The method of claim 14, wherein said fixing includes bolting the combined member to the pressure chamber portion.

19. The method of claim 14, wherein said fixing includes caulking the combined member to the pressure chamber portion.

* * * * *